United States Patent [19]

Schiessl et al.

[11] Patent Number: 4,481,595

[45] Date of Patent: Nov. 6, 1984

[54] METHOD AND APPARATUS FOR DETERMINING THE FILL LEVEL OF CONTAINERS

[76] Inventors: Hans Schiessl, Markgrafenstrasse 8, 7530 Pforzheim; Hermann Leistner, Im Lämmle 2, 7534 Birkenfeld 2, both of Fed. Rep. of Germany

[21] Appl. No.: 275,537

[22] Filed: Jun. 19, 1981

[51] Int. Cl.³ .............................................. B07C 5/342
[52] U.S. Cl. ................................... 364/562; 364/479; 209/529; 250/223 B; 73/293
[58] Field of Search ................ 364/562, 478, 479, 560, 364/563; 250/308, 357.1, 223 B; 73/293, 290 R; 377/24; 209/524, 525

[56] References Cited

U.S. PATENT DOCUMENTS

| | | | |
|---|---|---|---|
| 3,094,214 | 6/1963 | Wyman et al. | 250/223 B |
| 3,908,129 | 9/1975 | Akers | 250/357.1 X |
| 4,055,252 | 10/1977 | Klamm et al. | 209/524 |
| 4,182,451 | 1/1980 | Watson | 250/223 B X |
| 4,276,467 | 6/1981 | Dubberly et al. | 377/24 |
| 4,330,835 | 5/1982 | Gehm | 364/560 |
| 4,354,180 | 10/1982 | Harding | 73/293 X |

*Primary Examiner*—Edward J. Wise
*Attorney, Agent, or Firm*—Fuller, House & Hohenfeldt

[57] ABSTRACT

Containers pass through a radiation beam projected from a beam source to a detector. The detector output pulse rates at points where the container has passed partially into the beam and partially out of the beam are detected. Pulse rates during a measuring interval which lies between these points are divided by time units from a clock pulse generator to produce a signal representative of the average pulse rate during the interval. This signal is compared to a selectable reference signal. If a comparison is made, the comparator yields a signal indicative of whether or not material in the container was at a high enough level to attenuate the beam.

6 Claims, 3 Drawing Figures

METHOD AND APPARATUS FOR DETERMINING THE FILL LEVEL OF CONTAINERS

BACKGROUND OF THE INVENTION

This invention relates to a method and apparatus for determining if a container, such as a glass bottle, is filled with material to above or below a prescribed level.

In a known method for determining the fill level of containers, the containers are transported consecutively through a beam of penetrating radiation emanating from a radioactive isotope source. A radiation detector unit is located on the opposite side of the container from the radiation source. The detector unit converts the radiation photons to electric pulses. The pulses are summed within a definite measuring interval and the sum is compared with a reference or threshold value. The sum of the counts will be less than threshold value if the radiation beam has been attenuated by the presence of material in the container above the prescribed level and the pulse count sum will exceed the threshold value if the material level in the container was below the level of the radiation beam so as to not contribute to attenuation. In the latter case, the comparator provides a signal which causes an ejection device to operate and remove the underfilled container from the production line.

To define the measuring interval, it is necessary to determine the point in time at which the container begins to pass through the radiation beam. The ultimate determination as to whether the ejection threshold has been reached is critically dependent upon accurate definition of the measuring interval. In one previously known method, the measurement of the pulse rates is triggered or initiated when the container begins to pass through a light beam which is directed toward a photoelectric device. In this arrangement, the duration of the measuring interval is assumed to be constant.

Using a photoelectric device to determine the beginning of a measuring interval has several disadvantages. One disadvantage is that the light beam must be realigned with the photoelectric detector for containers such as glass bottles, plastic bottles and cans having different sizes and shapes. With any type of container it is necessary to initiate the measuring interval at exactly that point in time at which the leading external surface of the container moves into the radiation beam. Additional problems result when a change is made from inspecting a material level in containers which have clear walls to containers which do not such as cans made of metal.

Another problem with prior art fill-level determining apparatus is that measuring accuracy is affected by the speed with which the containers pass through the penetrating radiation beam. When the containers move slowly, the pulse count measuring interval may have already expired and yet the container may still be in the path of the beam. Hence, a loss of information needed for determination of the fill-level occurs. At the other extreme, when the containers pass through the penetrating radiation beam at very high speeds, the containers may be out of the beam already before the end of the defined pulse counting or measuring interval which again affects accurate determination or calculation of the fill-level adversely.

To eliminate the effect of these variables, it has been necessary in known methods and apparatus to coordinate the measuring area with the measuring time interval by adjusting container transit speed and by adjusting the level of the beam or the height of the container to account for variations in diameter of different containers in order to permit reliable differentiation between underfilled and overfilled containers.

A further disadvantage of using a photoelectric device is that it increases the cost and complexity of the system and requires periodic attention and adjustment.

Use of an inductive circuit breaker as a proximity switch instead of a photoelectric device has been proposed but this creates adjustment problems which are more serious than those resulting from use of a photoelectric device.

SUMMARY OF THE INVENTION

An object of the present invention is to provide a method and apparatus that is simple and accurate and avoids the regulation and adjustment problems that heretofore resulted from switching from inspection of one type of container to another and avoids the effects of variables in containers of the same type and geometric and speed variables as well.

In accordance with the invention, accuracy is greatly improved by an improved way of determining the beginning and end of the pulse counting or pulse rate measuring interval.

Stated in another way, changes in the counting rate at different times when the container is passing through the beam is used to determine the beginning and end of the useful pulse counting or measuring interval. Since the beginning and end of the measuring interval may be acquired from the counting rate itself, no information is lost as the entire course of the pulse rate over the cross section of the container becomes available for evaluation. Another benefit is that the effect of statistical fluctuations of the pulse counting rate are minimized.

Accordingly, it may be said that because of the new method, the measuring interval is adjusted automatically to the optimum attainable for accurate fill-level determination independently of the container passage speed and the geometry of the containers. It is only necessary to assume a suitable ejection threshold for determination of the fill-level for a particular surface mass of the container and the particular filler material.

An advantageous feature of the new method provides for defining a shortened measuring interval which selects out the particular points in time during which only the wall of the container is in the penetrating ray beam. This is in recognition that the reduction in the pulse rate is caused solely by means of the absorption or scattering of the gamma rays in or on the container wall and consequently is independent of the level of the material in the container. The shortened measuring interval, that is, an interval that corresponds to less than the width of the container, ensures that only such numbers of pulses are used for fill-height determination as may result from irradiation of the central area of the container where pulse rates differ significantly between full and underfilled containers. This means that statistical fluctuations of the counting rates within the measuring interval are also accounted for and it means greater accuracy in determining when the counters are to be triggered or enabled and disabled.

How the foregoing and other more specific objects of the invention are achieved will be evident in the description of illustrative embodiments of the method and apparatus which will now be set forth in reference to drawings.

DESCRIPTION OF A PREFERRED EMBODIMENT

The first embodiment of the invention will be explained in reference to FIGS. 1 and 2. In FIG. 2, a source that provides a penetrating radiation beam such as a gamma ray beam is represented by the block marked 10. One of the containers in a series of containers whose fill level is to be determined is marked 20. The containers are typically bottles although they may be cans as well. The containers pass through the penetrating radiation beam which is represented by an undulating arrowheaded line. The emergent beam which has been attenuated by an intervening container is received in a detector unit symbolized by the block marked 11. The detector puts out electric pulses at a rate corresponding to the rate of incoming gamma ray photons. The detector unit may be of a well-known type comprised of a scintillation crystal, a photomultiplier tube and a pulse height selector which are not illustrated specifically.

Figure 1:
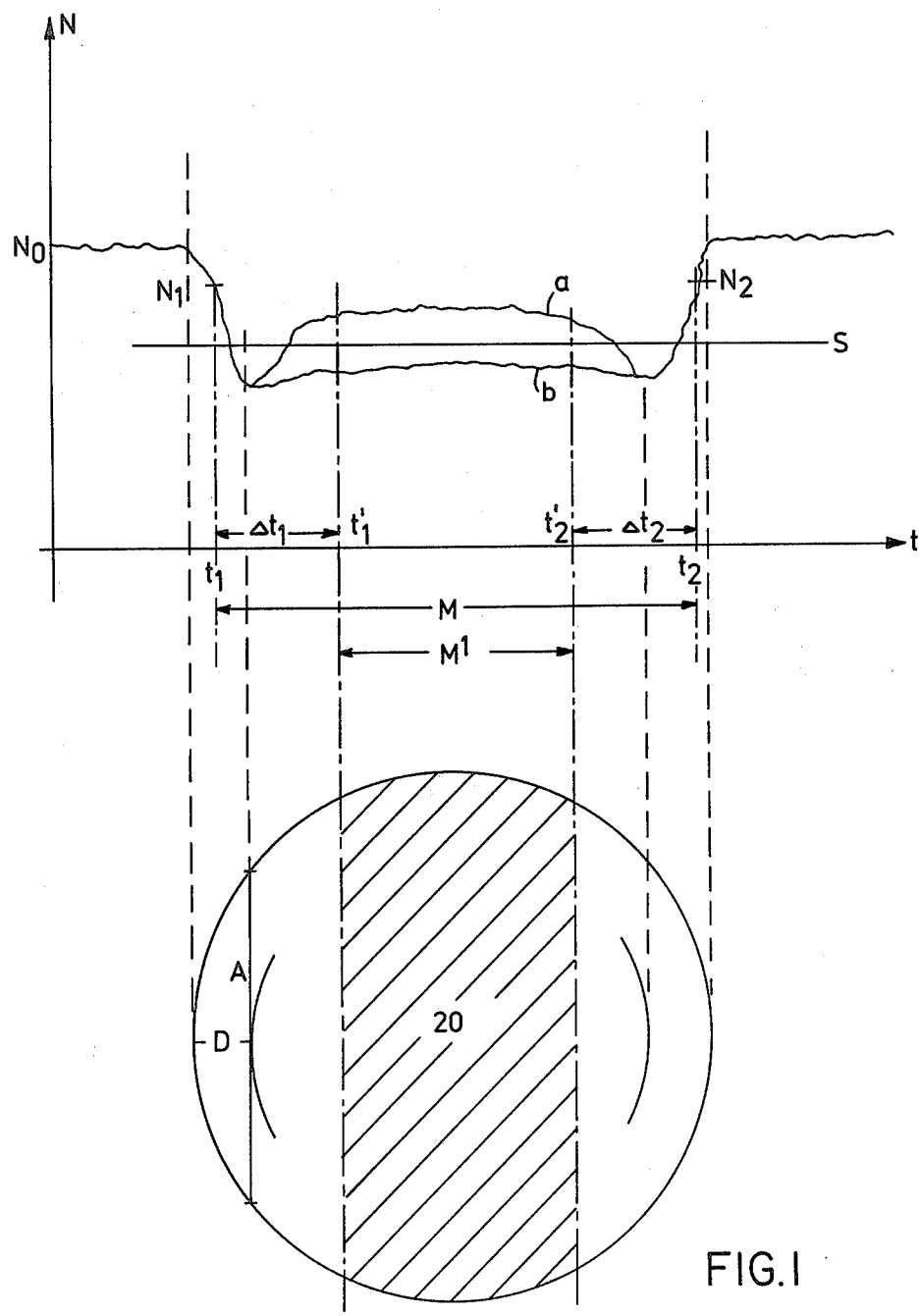
FIG. 1 is a graphical representation of pulse counting rates as ordinates and time as the abscissa for an associated bottle which is presently in the penetrating radiation beam.
Figure 2:
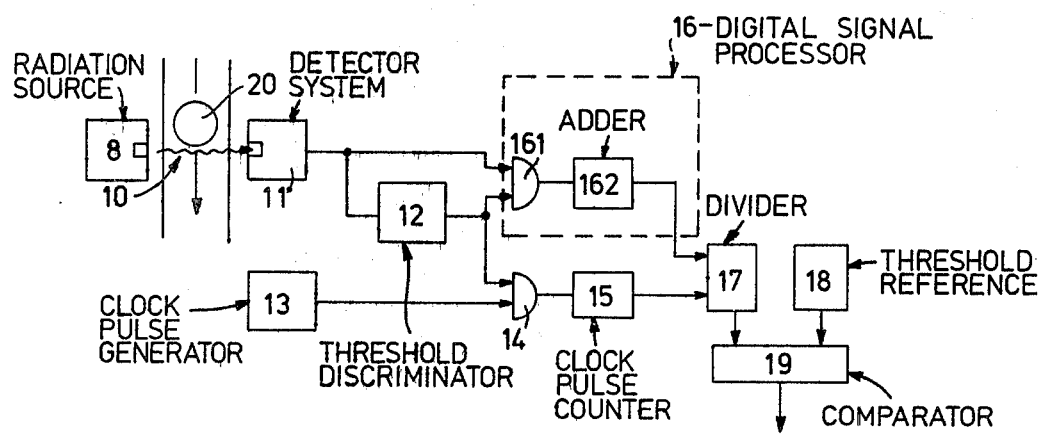
FIG. 2 is a block diagram of one type of apparatus for carrying out a first version of the method according to the invention.

Referring now to FIG. 1, the counting rates N of the pulses that are output from the detector 11 are plotted in in a graph as ordinates vs. time t on the abscissa. A cross-section of a container 20 having a wall thickness D is disposed next to the plot. When the container is moved through the radiation beam at constant speed the counting rates, N, will vary with time and, accordingly, with bottle container position as shown in the diagram.

One may see that after the front edge of container 20 enters the path of the rays, the pulse rate from the detector unit 11 drops to a minimum since at this time the maximum length A of absorption by the container wall is present. Thereafter, the pulse counting rates for a filled container 20 varies or follows the level indicated by the line marked b and with an empty or underfilled container the counting rates vary in respect to time in accordance with the line marked a. The absorption or scattering of the gamma rays in the irradiated material, when such material intervenes, produces the differences in the counting rates.

After the container 20 passes through the radiation beam, the pulse rate rises again to its orginal level. This level $N_0$ is accordingly the rate at which the pulses are put out by detector unit 11 when no container 20 is in the penetrating radiation beam.

The manner in which the pulse counting or measuring interval is determined in accordance with the invention will now be discussed.

Referring to FIG. 1, $N_0$ is the pulse count rate with no bottle or container in the radiation beam. The drop in the pulse rate to a value $N_1$ results from the wall of the container beginning to pass through the beam. $N_1$ is designated a first trigger or threshold level. This threshold pulse rate is sensed by a threshold discriminator represented by the block marked 12 in FIG. 2. Sensing of the threshold initiates pulse counting as will be explained. The trigger threshold $N_1$ must necessarily be selected so that it lies outside of the statistical fluctuations of the pulse rate $N_0$. The point in time $t_1$ at which the pulse rate falls below trigger threshold $N_1$, therefore, marks the beginning of the measuring interval M as it is designated in the embodiment of the invention which is being discussed presently. Sensing of the first threshold at $t_1$ by discriminator 12 in FIG. 2 results in an output signal from the discriminator. The output of the discriminator is in a circuit with a first AND gate 14 and a second AND gate 161 which respond to input of the threshold signal by becoming enabled to gate clock pulses and pulses corresponding to photons, respectively. A clock pulse counter 15 is used and it is provided with clock or timing pulses from a clock pulse generator 13. The output of AND gate 161 is coupled to an adder circuit 162. When threshold is sensed and the beginning of the measuring interval M occurs, the adder circuit 162 counts all of the pulses delivered from the detector unit 11. Simultaneously with occurrence of the first threshold or count triggering event, counter 15 begins to count clock pulses or unit time pulses from generator 13.

Referring further to FIG. 1, after the container 20 passes through the radiation beam, the pulse rate N finally reaches a second trigger threshold $N_2$ which again is sensed by the threshold discriminator 12. Then the threshold discriminator output changes level to disable AND gates 161 and 14 so that they no longer output detected pulses and clock pulses, respectively. The number of detector pulses counted then remains unchanged in the adder 162 and the number of clock pulses counted remains unchanged in counter 15.

The contents of the adder circuit 162 and the time unit counter 15 are delivered to a divider circuit represented by the block marked 17. The divider circuit forms the quotient of these two counts and, accordingly, the average pulse rate in the measuring interval M. This measured average pulse rate is then fed to one input of a comparator 19 whose other input receives a signal value representative of a container fill reject threshold S from a threshold reference value storage device 18. The container reject threshold S is selected in such manner that if it is exceeded in the comparator by the quotient count, it is indicative of the beam not being attenuated by material in the container and of the material level being below the desired level. If the quotient is below the reference threshold value it is an indication that the material in the container is filled to at least the minimum required level. Stated in another way, if the measured pulse rate corresponds to the curve b in FIG. 1, the average pulse rates in the measuring interval M will lie below the rejection threshold S and, consequently, comparator 19 will not deliver an output signal. If the beam is not attenuated by intervening fill material, curve "a" will be in effect and the comparator 19 will output a signal. This signal is used to control a well-known container rejection or ejection device, not shown, which removes the improperly filled container from the line of containers progressing through the inspection beam.

The embodiment of the invention just described is advantageous in that a very simply constructed signal processing unit 16 can be used since the pulse rates during the measuring interval M are just added. This embodiment provides reliability and accuracy of level evaluation which is satisfactory for most practical applications.

Another embodiment of the invention which provides even greater accuracy will now be described in reference to FIGS. 1 and 3.

On inspection of the counting rate curves in FIG. 1 one may see that the two curves a and b extend almost congruently as long as the container wall structure with the thickness D moves through the path of the penetrating radiation beam. This means that at the beginning and end portions of the measuring interval M, substantially no usable information can be obtained as to whether the material in the container is above or below the desired level. Moreover, the thicknesses of the wall of different containers may vary such that anomalous information is yielded. According to the invention, provision is made for defining a shortened measuring interval M' for evaluating fill level which permits exclusion of anomalous information. As shown in the graph, first the pulse rates are advanced from a point in time $t_1$ which lies one time span $\Delta t_1$ after the point of time $t_1$ where the first trigger threshold $N_1$ falls below the curve. Correspondingly, the measuring interval will be ended at a point of time $t_2'$ which lies in a time span $\Delta t_2$ before the point of time $t_2$ where the second trigger threshold $N_2$ is exceeded. Thus the measuring interval lies between $t'_1$ and $t'_2$. This shortened measuring interval M' covers the time in which the middle area of the container 20 passes the radiation beam from source 10. The central area of interest is shown cross-hatched in FIG. 1.

Hence the indefinite information on the pulse rates N at the beginning and end areas of the container 20 is eliminated. Thus only those parts of the pulse rate curves for overfill and underfill wich clearly differ from one another are used as in this area the conditions of container underfill and fill produce the maximum differential between pulse rates. The greater differences results in more accurate evaluation of the level of the material in the container.

Figure 3:
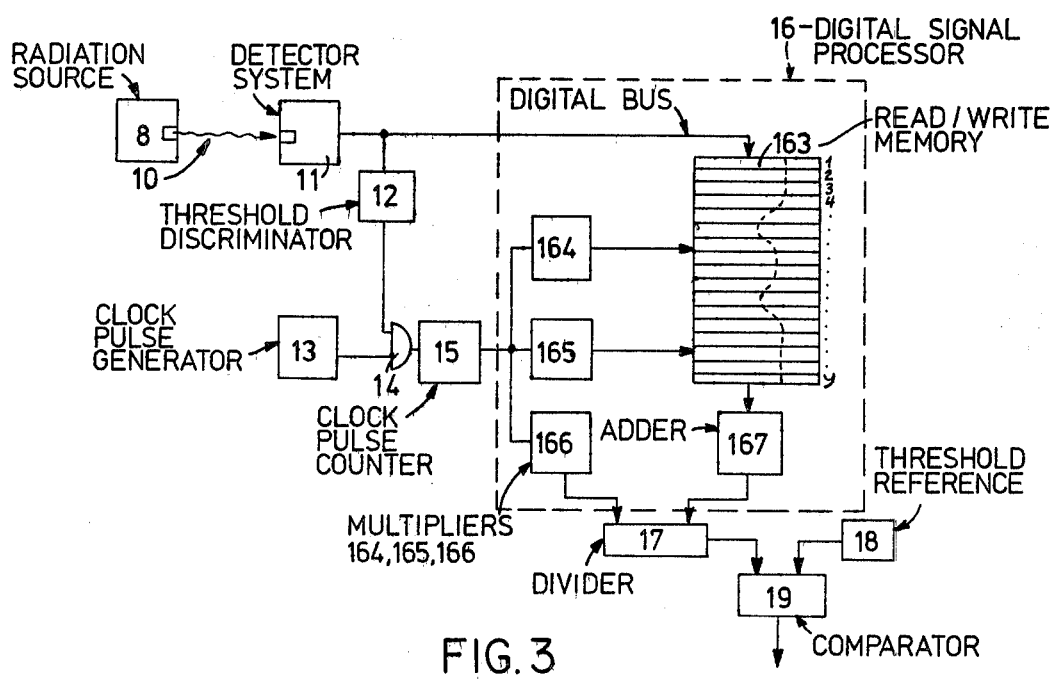
FIG. 3 is a block diagram of another apparatus for carrying out a second version of the method according to the invention.

To obtain and use a shortened measuring interval M' a processing circuit 16 is shown in FIG. 3 is employed. For determination of the points of time $t_1'$ and $t_2'$ practically the entire pulse rate must be stored, and indeed, not cummulatively as in the addition circuit 162, but individually.

The FIG. 3 embodiment, therefore, provides a signal processing unit which has multiplication circuits 164 and 166 and an addition circuit 167 similar to the addition circuit 162 with a read-write memory 163 now being included.

The pulse rates provided by the detector 11 are entered consecutively cyclically (the devices required for the cyclic storage are not shown for the sake of simplicity) in the electronic read-write memory unit 163 and are pushed further with each cycle so that after the container 20 passes through the beam the course of the pulse rates in FIG. 1 is stored in the electronic read-write memory 163 as is shown symbolically in FIG. 3.

As in the first embodiment, the clock pulse counter 15 counts the clock or unit time pulses during the measuring interval M. The point of time $t_1$ and $t_2$ of the beginning or end, respectively, of the measuring interval M are marked in the electronic read-write memory 163 at the pertinent pulse rate. The addresses of the count rates in the memory 163 are accordingly numbered in a continuous fashion from 1 to y from the point of time $t_1$.

When counter 15 becomes enabled by discriminator 12, the counter output is input to three multiplication circuits 164, 165 and 166 which cooperate to shorten the measuring interval M to the measuring interval M'.

The first multiplication circuit 164 multiplies the total number of the time units by a factor x, where x lies between 0 and 0.5. Thus the starting point of time $t_1$ as in FIG. 1 is established.

Correspondingly (with symmetrical reduction), the second multiplication circuit 165 multiplies the time units by a factor $(1-x)$, so that the end point of time $t_2$ is determined. The addresses of the memory unit contents (pulse rates) whose addresses lie between both addresses given out by the two multiplication circuits 164 and 165 are added in the addition circuit 167. At the output of the addition circuit 167, therefore, the total pulse rate is available during the measuring interval M'. Because of the shortened measuring interval and the corresponding reduction of clock pulses or time units during the interval, the total number of time units given off by the clock pulse counter 15 in the measuring interval M are not used. Therefore, a third multiplication circuit 166 is used. It multiplies the clock pulses counted by the time unit counter 15 by the factor $(1-2x)$, and thereupon calculates the number of clock pulses or time units in the measuring interval M'.

In FIG. 3 as in FIG. 2, the total pulse rate and a time unit number may be supplied to divider circuit 17 so that at the output of the divider circuit the average pulse rate in the shortened measuring interval M' is plottable. Further processing of the signals as with the threshold reference value indicator 18 and the comparator 19 is similar to what has been described in connection with the FIG. 2 embodiment and need not be repeated. However it may be noted that for the FIG. 3 mode, another rejection threshold S' will be selected.

The FIGS. 2 and 3 block diagrams are sufficient for explaining the fundamental construction of the apparatus according to the invention. In this connnection, addition devices which do not touch on the essence of the invention are not shown for the sake of clarity.

In particular, in the second embodiment illustrated in FIG. 3, on account of the large memory capacity needed it is advantageous to carry out the entire operation with a programmable microcomputer, not shown. A Zilog Z80 microprocessor is suitable.

The second embodiment of the method permits taking into account flucuations or drift in the pulse rate $N_0$ and accordingly permits after-regulation of the trigger thresholds $N_1$ and $N_2$ and the rejection threshold S'. In other words, the indicated thresholds may be raised or lowered, respectively, in the same relation as the maximum counting rate $N_0$ increases or decreases. For instance, in a definite time interval between two containers the pulse rate from the detector may be measured and compared with the previous $N_0$. If significant differences occur, a special control circuit, not shown, may be used to energize or trigger the threshold discriminator 12 and the reference threshold value indicator 18 to adapt the trigger thresholds $N_1$ and $N_2$ and the rejection threshold S.

In summary, the invention provides a simple method for determining the fill level of containers with great accuracy. Avoidance of external trigger devices such as photoelectric devices or proximity switches permits elimination of periodic and time-consuming adjustments of the system components.

We claim:

1. A method of determining if containers are filled with a material to a selected level comprising the steps of:

transporting the containers across the path of a penetrating radiation beam that is projected from a radiation source to detector means which produces output pulse signals at a certain rate when no part of a container is in the beam and at lower rates when the beam is attenuated by the container and a material therein passing through the beam, detecting the time ($t_1$) when the output pulse signal rate drops from a rate ($N_0$) corresponding to no part of a container being in the beam to a threshold rate corresponding to the leading wall of a moving container entering and attenuating the beam and to the start of a fill-height measuring interval (M), initiating summing of said output pulse signals at the start of said interval and simultaneously initiating summing of clock pulses signals, detecting the time ($t_2$) when said output pulse signal rate increases again to the threshold rate corresponding to the trailing wall of said moving container entering and attenuating the beam and to the end of said measuring interval, terminating said summing of output pulse and clock pulse signals at said end of the measuring interval and then dividing one of the sums by the other to yield a test signal substantially representative of the average output pulse rate over the measuring interval, and comparing the test signal with a reference signal to produce a difference signal whode magnitude is indicative of whether or not the container is filled high enough for its contents to attenuate the beam.

2. The method according to claim 1 wherein the measuring interval (M) lies between those points in time ($t_1$ and $t_2$) wherein the pulse rates at each point corresponds with a predetermined fraction of the pulse rate ($N_0$) corresponding to no container being in the beam.

3. The method according to claim 1 wherein at the points where said measuring interval (M) is initiated and terminated the pulse rates are equal.

4. Apparatus for determining if containers are filled with a material to a predetermined level, comprising:

a source for projecting a beam of penetrating radiation and a radiation detector unit spaced from the source for permitting containers to pass through the beam, said detector unit processing electric output pulses at a rate corresponding to the intensity of the beam received thereby, threshold discriminator means coupled to detector unit for sensing when said electric output pulse rate falls from a rate ($N_0$) corresponding to no container being in the beam to a first trigger threshold rate ($N_1$) corresponding to said container having passed partially in said beam and for sensing a second trigger threshold level ($N_2$) corresponding to said container having passed partially out of said beam at which time said pulse rate is increasing again toward ($N_0$), an addition circuit having input and output means, and means coupling said circuit to said detector unit, a timing pulse counter having input and output means, generator means having output means coupled to the input means of said timing pulse counter, said generator means being operative to output a train of timing pulses spaced from each other by a unit of time, occurrence of said first trigger threshold ($N_1$) causing said addition circuit to count electric output pulses and said timing pulse counter to count said timing pulses and occurrence of said second trigger threshold causing said addition circuit and timing pulse counter to terminate counting, a division circuit having input means coupled to the respective output means of said addition circuit and said timing pulse counter, said division circuit being operative to produce an output signal representative of the quotient of said electric output pulse counts and said timing pulse counts of the average output pulse rate between occurence of ($N_1$) and ($N_2$), a generator of a reference rate signal, and comparator means for comparing said signals corresponding to said average pulse rate and said reference rate and for producing a signal indicative of whether or not said material level in the container was above or below said beam.

5. Apparatus for determining if containers are filled with a material to a predetermined level, comprising:

a source for projecting a beam of penetrating radiation and a radiation detector unit spaced from the source for permitting containers to pass through the beam, said detector unit producing electric output pulses at a rate depending on the amount of attenuation of the beam, threshold discriminator means coupled to the detector unit for sensing when said electric output pulse rate falls from a rate ($N_0$) corresponding to no container being in the beam to a first trigger threshold rate ($N_1$) corresponding to said container having passed partially into said beam and for sensing when said output pulse rate rises to a second trigger threshold rate ($N_2$) corresponding to said container having passed partially out of said beam, a timing pulse counter having input and output means, a timing pulse generator for producing a train of timing pulses that are spaced from each other by a unit of time, gate means which when enabled upon occurrence of said first threshold trigger ($N_1$) couples said timing pulse generator to said counter, read-write memory means to locations in which said electric output pulse rates are addressed, said threshold discriminator being operative to mark the addresses to those locations whose pulse rate corresponds to the trigger threshold rates $N_1$ and $N_2$ which correspond respectively in time to $t_1$ and $t_2$, first, second and third multiplication circuits each having an input coupled to the output means of said timing pulse counter and each having an output means, said circuits respectively, multiplying said timing pulses by factors (x), (1−x) and (1−2x), said circuits being operative to provide for a rate measuring interval that starts after $t_1$ and a time $t_1'$ and ends before $t_2$ at a time $t_2'$, said (x) having a value between 0 and 0.5, signals corresponding to the results of the multiplications in said first and second multipliers, marking the addresses of the memory locations corresponding to the pulse rates at times $t_1'$ and $t_2'$, respectively, a division circuit having plural input means, one of the input means being coupled to the output means of said third multiplication circuit to provide said division circuit with the number of time units in the measuring interval between $t'_1$ and $t'_2$, an addition circuit having input means for receiving from said memory said pulse rates between locations in said memory marked by $t_1'$ and $t_2'$ and said addition circuit having output means coupled to the other input of said division circuit, said division circuit being operative to calculate the average pulse rate during the measuring interval, and means for comparing a signal corresponding to said average pulse rate with a selected reference signal and for producing a signal indicative of whether or not said material level in the container was above or below said beam.

6. A method of determining if containers are filled with material to a selected level comprising the steps of:

transporting the containers across the path of a penetrating radiation beam that is projected from a radiation source to detector means which produces output pulse signals at a certain rate when no part of a container is in the beam and at lower rates when the beam is attenuated by the container and a material therein passing through the beam, generating a train of clock pulses having constant periodicity, continuously and cyclically assigning to consecutive locations in a read-write memory values corresponding to the detector means output pulse signal rate during consecutive clock pulse periods, detecting the time $(t_1)$ when said output pulse signal rate drops from a rate $(N_0)$ corresponding to no part of a moving container being in the beam to a rate corresponding to the leading wall of the container entering and attenuating the beam and ultimately detecting the time $(t_2)$ when the trailing wall of said container is in and is attenuating the beam, at times $(t_1)$ and $(t_2)$ marking the addresses of the locations in said memory at which the output pulse signal rates at said times are located, at time $(t_1)$ start first, second and third simultaneous counts of the clock pulses and at time $(t_2)$ multiply the first total clock pulse count by a factor x where x lies between 0 and 0.5, multiply the second total clock pulse count by a factor $(1-x)$, and multiply the third total clock pulse count by a factor $(1-2x)$, the result of the first multiplication corresponding to a first address following the address to the memory location where the output pulse rate at time $(t_1)$ is stored and the result of the second multiplications corresponding to a second address preceding the address to the memory location where the output pulse rate at time $(t_2)$ is stored, and the result of the third multiplication corresponds to the number of clock pulses in the fill-height measuring interval defined as M' and extending from said last named first and second addresses, summing the total pulse rate values in said memory over said measuring interval M', dividing the result of said last mentioned summation by said number of clock pulses in the measuring interval where the result of said division corresponds to a test signal, and comparing the test signal with a reference signal to produce a difference signal whose magnitude is indicative of whether or not the container is filled high enough for its contents to attenuate the beam.

* * * * *